(12) United States Patent
Takizawa et al.

(10) Patent No.: US 6,834,861 B2
(45) Date of Patent: Dec. 28, 2004

(54) TWO PIECE OIL CONTROL RING WITH NITRIDED SURFACE LAYERS

(75) Inventors: Akiyoshi Takizawa, Kashiwazaki (JP); Nobuo Katayama, Kashiwazaki (JP)

(73) Assignee: Riken Corporation, Tokyo (JP)

( * ) Notice: Subject to any disclaimer, the term of this patent is extended or adjusted under 35 U.S.C. 154(b) by 0 days.

(21) Appl. No.: 10/398,679

(22) PCT Filed: Aug. 30, 2002

(86) PCT No.: PCT/JP02/08812

§ 371 (c)(1), (2), (4) Date: Apr. 9, 2003

(87) PCT Pub. No.: WO03/019650

PCT Pub. Date: Mar. 6, 2003

(65) Prior Publication Data

US 2004/0021270 A1 Feb. 5, 2004

(30) Foreign Application Priority Data

Aug. 31, 2001 (JP) ........................................ 2001-262805

(51) Int. Cl.$^7$ ............................................. B60T 11/236
(52) U.S. Cl. ......................... 277/436; 277/433; 277/434
(58) Field of Search .................................. 277/436, 434, 277/443, 444, 449, 464

(56) References Cited

U.S. PATENT DOCUMENTS

| | | | | |
|---|---|---|---|---|
| 4,407,515 A | * | 10/1983 | Naito | 277/443 |
| 4,522,412 A | * | 6/1985 | Kubo | 277/443 |
| 5,295,696 A | * | 3/1994 | Harayama et al. | 277/443 |
| 5,651,553 A | * | 7/1997 | Ishida et al. | 277/434 |
| 5,820,131 A | * | 10/1998 | Tanaka et al. | 277/442 |
| 6,213,474 B1 | * | 4/2001 | Sameshima et al. | 277/434 |
| 6,454,271 B2 | * | 9/2002 | Ishida | 277/434 |

FOREIGN PATENT DOCUMENTS

| | | | |
|---|---|---|---|
| JP | 3-88946 | * | 4/1991 |
| JP | 8-159282 | * | 6/1996 |
| JP | 8-338530 | * | 12/1996 |

* cited by examiner

Primary Examiner—William L. Miller
(74) Attorney, Agent, or Firm—Bachman & LaPointe, P.C.

(57) ABSTRACT

A two piece oil control ring is provided which comprises a ring body (1) formed into a generally M- or I-shaped section with an annular groove (4) on an inside surface (3) of the ring body (1); and a coiled expander (2) attached in the annular groove (4) of the ring body (1) for resiliently urging the ring body (1) toward an inner wall of a cylinder. The ring body (1) is made of stainless steel that contains chromium of 3.0 to 13.0 weight % with the outer and inner circumferential surfaces (11, 12) covered with nitrided layers (14, 15). Circular ratio ($\tau$) of an outer edge length ($Y_o$) to an inner edge length ($Y_i$) in the cross section of the ring body (1) is in a range between 1.08 and 1.32 to keep precise peripheral circularity of the ring body so that the nitrided layers survive lapping of the ring body (14, 15).

3 Claims, 4 Drawing Sheets

TWO PIECE OIL CONTROL RING WITH NITRIDED SURFACE LAYERS

This invention relates to an oil control ring attached in a ring groove of a piston in an internal combustion engine, in particular to a two piece oil control ring that has a coiled expander and a ring body with nitrided surface layers formed thereon.

BACKGROUND OF THE INVENTION

Various types of coil expander loaded oil control rings have generally been utilized in most of diesel engines. A typical example of two piece oil control rings comprises, as shown in FIG. 6, a ring body 1 with an annular groove 4 on an inside surface 3 of ring body 1; and a coiled expander 2 attached in annular groove 4 of ring body 1. Ring body 1 comprises an upper rail 5, a lower rail 6 and a web 7 that connects upper and lower rails 5, 6 to form a generally M-shaped section. A plurality of openings 8 are formed in web 7 to allow lubricating oil to pass through the openings 8.

Not shown but, wear resistant surface layers are formed on outer peripheral surfaces of upper and lower rails 5, 6, and on inner peripheral surfaces of ring body 1 with annular groove 4. Coiled expander 2 can produce elastic force to resiliently urge each outer peripheral surface of upper and lower rails 5, 6 toward an inner wall of a cylinder not shown. Cross sectional shape of ring body 1 is determined in considering followability in operation of deformable ring body 1 to inner circumferential surface of cylinder, tangential force of oil control ring, stress of ring body 1 produced when attached in a groove formed in piston, running stress and workability of wire rods into rings so that the oil control ring can perform such essential function as to apply an appropriate amount of lubricating oil on the inner surface of cylinder. In response to recent requirement of higher power and lower fuel consumption for diesel engines, ring bodies are formed of steel in lieu of cast iron, and wear resistant surface layers are formed by nitriding instead of hard chromium plating to improve wear and scuff-resistance of ring body.

Japanese Patent Disclosure No. 6-336951 shows an oil control ring that has a ring body made of 17% chromium stainless steel with ion-nitrided layers formed on outer and inner circumferential surfaces of ring body. In making such an oil control ring with ion-nitrided layer, a drawing process is used to produce a deformed wire rod of a given usual cross section, and then a plurality of openings are formed in a web of the wire rod by punching. Then, the wire rod is formed into a coil and cut into ring bodies, lapped with outer circumferential surfaces of the ring bodies, ground with upper and bottom surfaces of the ring bodies, and nitrided with whole circumferential surface or necessary areas of the ring bodies. After nitriding, the ring bodies are ground in a similar way to finish oil rings of final shape.

Some attempts have recently been made to fabricate a two piece oil control ring made of stainless steel of low chromium content less than 17 weight % to reduce manufacturing cost. This oil control ring is, however, disadvantageous in that roundness or circularity of ring body is remarkably deteriorated with warpage upon nitriding expansion during and after a nitriding process because the process involves unbalanced stresses produced in inner and outer nitrided layers of ring body formed into M- or I-shape made of stainless steel having low chromium content. When nitrided layers are formed on whole circumferential surfaces of M- or I-shaped ring body 1, the nitrided layers are expanded to generate compression stresses in the nitrided layers, and thereby to cause tensile stresses in the base material and incidental distortion in the inner and outer circumferential sides of ring body 1. If distortion produced in the outer circumferential side is greater than that produced in the inner circumferential side, the outer circumferential side naturally expands with longer extended length than that of the inner circumferential side, deforming end portions of ring body 1 toward the inner circumferential side. When the lapping process is applied to circumferential surfaces of such deformed ring, the end portions of ring body cannot uniformly be lapped due to distortion by nitriding. When an oil control ring of degraded circularity is attached to a piston, it provides a clearance or gap between an inner surface of a cylinder and outer circumferential surface of the oil ring, thereby resulting in detrimentally increased oil consumption. Otherwise, when the whole outer circumferential surface is lapped to a required periphery circularity of ring body, the nitrided layer is disadvantageously removed by lapping, and therefore, after nitriding, lapping of the ring body is extremely restricted or should be performed very carefully. On another aspect, it also has been found that reduced chromium content deteriorates creep resistance of ring body.

FIG. 5 is a graph showing increase of lapping amount and elapse of lapping time in a proportional relationship. The term "lapping" referred herein means any process for polishing, grinding, scouring, scrubbing or abrading a ring body with lapping agent to adjust or compensate dimensional error or to improve surface finish during manufacture. For example, a nitrided layer of 70 micrometers thickness is thoroughly removed through a lapping process of 105 seconds. Accordingly, lapping time should be within 105 seconds to surely leave nitrided layers on whole outer circumferential surfaces of ring body 1 so as to bring lapped profile of nitrided layers in ring body 1 into contact to inner surface of cylinder. A prior art ring body of 17% Cr stainless steel produces similar unbalanced stresses in inner and outer nitrided layers, but indicates very little amount of strain due to nitridation because 17% Cr stainless steel has greater mechanical strength, and whole circumferential surfaces of the ring body can be lapped by usual process without presenting any substantial problem. However, cost problem is still involved in 17% Cr stainless steel.

An object of the present invention is to provide a two piece oil control ring that has a ring body capable of keeping such peripheral circularity that nitrided layer formed on the ring body survives lapping. Another object of the present invention is to provide a two piece oil control ring with a ring body that can control or restrict amount of deformation produced when nitrided layer is formed on a surface of the ring body. Still another object of the instant invention is to provide a two piece oil control ring with a ring body made of stainless steel having low chromium content.

SUMMARY OF THE INVENTION

A two piece oil control ring according to the present invention, comprises a ring body (1) formed into a generally M- or I-shaped section with an annular groove (4) on an inside surface (3) of the ring body (1); and a coiled expander (2) attached in the annular groove (4) of the ring body (1) for resiliently urging the ring body (1) toward an inner wall of a cylinder. The ring body (1) comprises upper and lower rails (5, 6) and a web (7) that connects the upper and lower rails (5, 6), the web (7) being provided with a plurality of openings (8) for allowing lubricating oil to pass therethrough. The ring body (1) is made of stainless steel that contains chromium of 3.0 to 13.0 weight % with the outer and inner circumferential surfaces (11, 12) covered with nitrided layers (14, 15). A circular ratio ($\tau$) of an outer surface (edge) length ($Y_o$) to an inner surface (edge) length ($Y_i$) in the cross section of the ring body (1) is in a range between 1.08 and 1.32 to keep precise peripheral circularity of the ring body (1) with less strain or deformation by nitridation and thereby to allow the nitrided layers (14, 15) to survive lapping of the ring body (1).

The above-mentioned objects and advantages of the present invention will be apparent from the following description in connection with preferred embodiments shown in the accompanying drawings wherein.

DISCLOSURE OF THE PRESENT INVENTION

Figure 1:
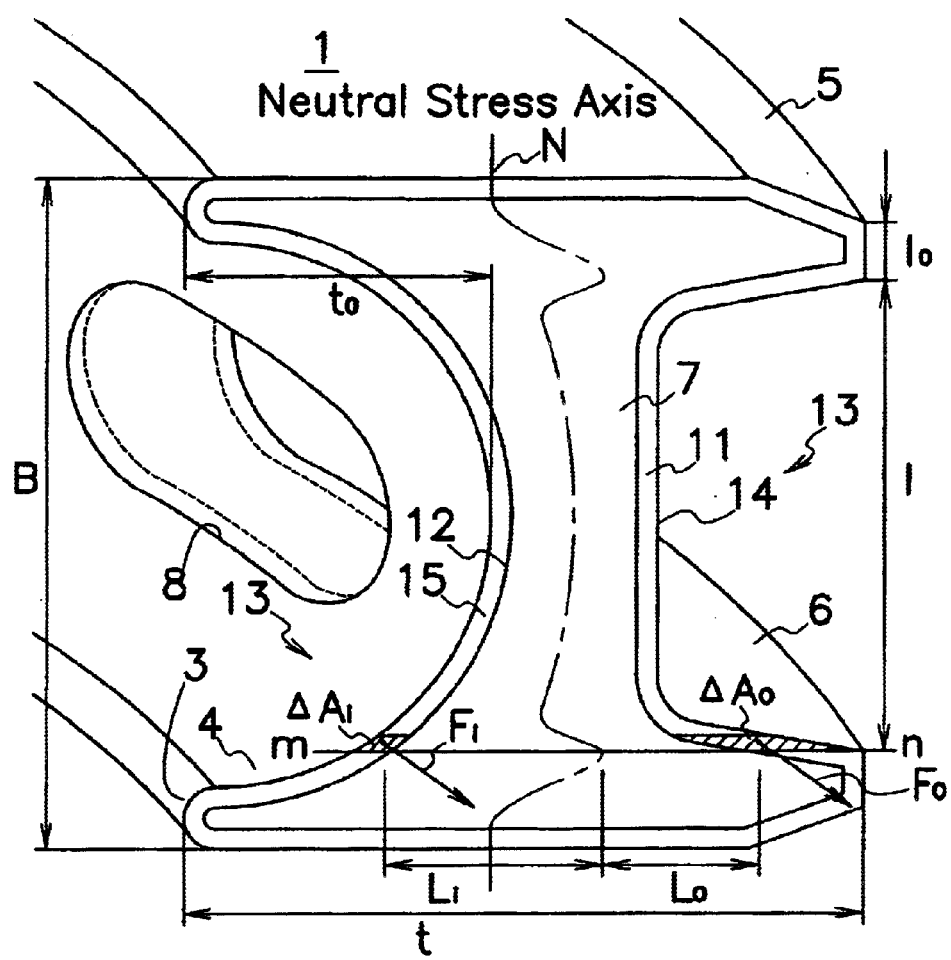
FIG. 1 is a perspective sectional view of a ring body with nitrided layers used in a two piece oil control ring according to the present invention.
Figure 6:
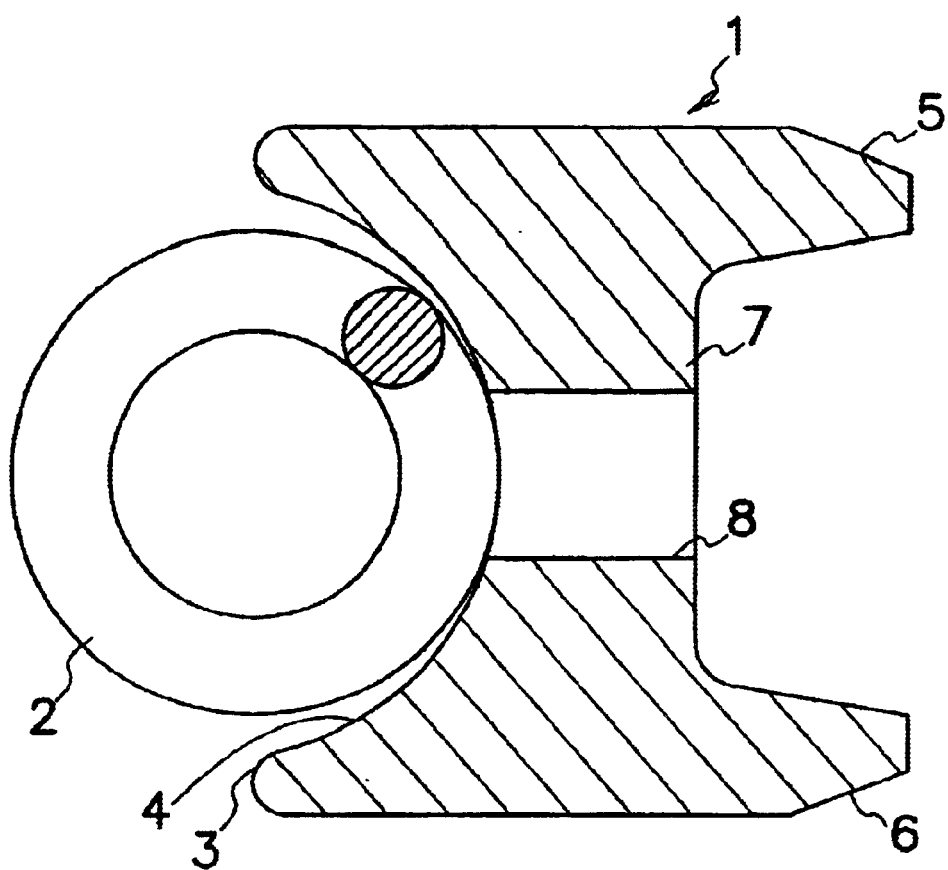
FIG. 6 is a sectional view of a ring body used in a prior art two piece type oil ring.

FIG. 1 illustrates a ring boy 1 used in an oil control ring according to the present invention. Ring body 1 is formed of stainless steel containing chromium of 3.0 to 13.0 weight %, and is coated with nitrided layers 13 that comprises an outer nitrided layer 14 formed on an outer circumferential surface 11 of ring body 1; and an inner nitrided layer 15 formed on an inner circumferential surface 12. Similarly to prior art oil control ring shown in FIG. 6, ring body 1 of FIG. 1 is formed with a plurality of openings 8 through which lubricating oil passes. Ring body 1 has its width B: 1.2 to 2.0 mm, thickness t: 1.2 to 2.0 mm, land (rail) width $l_0$: 0.15 to 0.22 mm and annular groove depth $t_0$: 0.5 to 0.75.

Nitridation expansion of ring body 1 generates different deformation of outer and inner nitrided layers 14 and 15, resulting in warpage of ring body 1, and it would be necessary to balance compressive forces resulted from nitridation expansion of outer and inner nitrided layers 14, 15 in order to control or restrict deformation or warpage of ring body 1.

Assuming that $\Delta F_o$ and $\Delta F_i$ respectively indicate outer and inner circumferential forces generated in each small area $\Delta A_o$ and $\Delta A_i$ on an imaginary sectional line m-n in ring body 1, and $L_o$ and $L_i$ respectively represent distances from neutral stress axis N to central points of small area $\Delta A_o$ and $\Delta A_i$, if total or integrated moments of force exerted on small areas $\Delta A_o$ and $\Delta A_i$ are substantially equal to each other, it can be appreciated that no deformation would occur in ring body 1, as shown by the following formula (1):

$$\Sigma(\Delta F_o \times L_o) = \Sigma(\Delta F_i \times L_i) \quad (1)$$

In this case, distances $L_o$ and $L_i$ from neutral stress axis N to central points of small area $\Delta A_o$ and $\Delta A_i$ are not equal ($L_o \neq L_i$) to each other. Suppose $k = \Sigma L_o / \Sigma L_i$, equation (1) can be developed to equation (2):

$$k\Sigma\Delta F_o = \Sigma\Delta F_i \quad (2)$$

As forces resulted from expansion of nitrided layers are in proportion to areas of nitrided layers, if outer and inner nitrided small areas are shown by $\Delta A_o$ and $\Delta A_i$, equation (2) can be developed to equation (3). Also, assuming that $A_o$ and $A_i$ represent total outer and inner nitrided areas respectively, equation (3) can be rewritten as equation (4). Moreover, supposing $Y_o$ and $Y_i$ indicate whole surface (edge) lengths of the outer and inner nitrided areas in cross section of ring body 1 with the nitrided layer of constant thickness t, we have: $A_o = Y_o \times t$ and $A_i = Y_i \times t$. If these equations are substituted for equation (4), we have equation (5).

$$k\Sigma\Delta A_o = \Delta\Sigma A_i \quad (3)$$

$$kA_o = A_i \quad (4)$$

$$kY_o = Y_i \quad (5)$$

Accordingly, these equations show that ring body 1 should be formed with a constant ratio of outer surface (edge) length to inner surface (edge) length in section areas in order to control or suppress deformation due to nitridation.

EXAMPLE

To test oil control rings according to the present invention, ring bodies of different cross section of nine (9) kinds were prepared and lapped with lapping agent untill lapped profile was formed on whole outer circumferential surfaces of each ring body, measuring lapping time therefor and checking status of lapped nitrided layers. Test results is shown in the following table wherein symbols show the following:

B(mm): Width of ring body; t (mm): Thickness of ring body; $l_0$ (mm): Land (Rail) width; l (mm): Length between rails; $t_0$ (mm): Groove depth; $\theta$ (degrees): Rail angle; $\tau$: Circular ratio of an outer surface (edge) length $Y_o$ to an inner surface (edge) length $Y_i$ in cross section of ring body 1; T (seconds): Lapping time; A: Whole nitrided layers that do not survive lapping; P: Whole nitrided layers that survive lapping.

TABLE

Test Result

| Sample No. | B | t | $l_0$ | l | $t_0$ | $\theta$ | $\tau$ | T | A/P |
|---|---|---|---|---|---|---|---|---|---|
| 1 | 1.5 | 1.5 | 0.18 | 1.06 | 0.7 | 9 | 1.01 | 150 | A |
| 2 | 1.5 | 1.5 | 0.18 | 1.06 | 0.65 | 9 | 1.09 | 103 | P |
| 3 | 1.5 | 1.5 | 0.18 | 1.06 | 0.60 | 9 | 1.18 | 80 | P |
| 4 | 2.0 | 2.0 | 0.18 | 1.41 | 0.75 | 10 | 1.20 | 80 | P |
| 5 | 2.0 | 2.0 | 0.18 | 1.41 | 0.65 | 10 | 1.32 | 103 | P |
| 6 | 1.5 | 1.5 | 0.18 | 1.06 | 0.5 | 6 | 1.37 | 200 | A |
| 7 | 3.0 | 2.0 | 0.18 | 1.70 | 0.9 | 10 | 1.16 | 85 | P |
| 8 | 2.5 | 2.0 | 0.20 | 1.50 | 0.82 | 10 | 1.24 | 85 | P |
| 9 | 4.0 | 3.0 | 0.30 | 2.90 | 1.5 | 20 | 1.08 | 104 | P |

Figure 2:
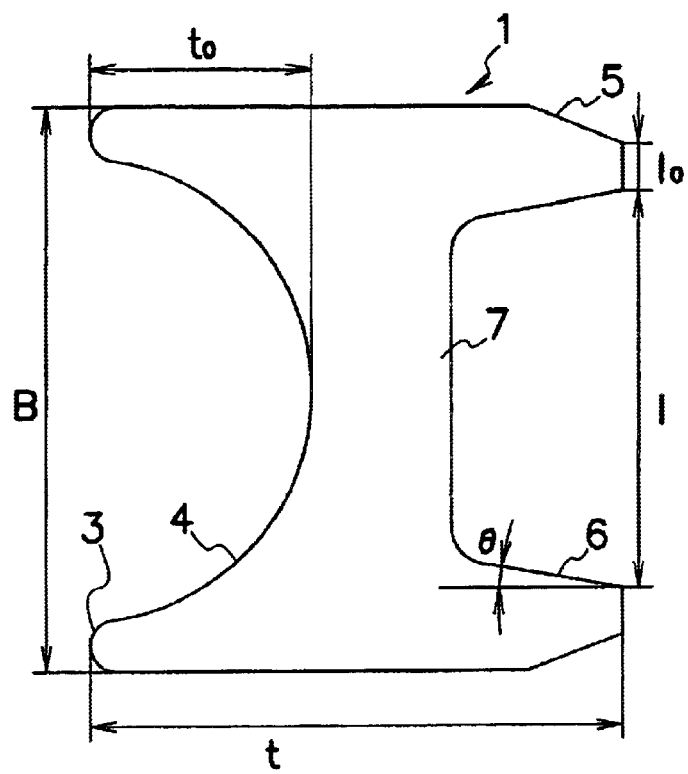
FIG. 2 is a cross section of the ring body generally formed into M-shape.
Figure 3:
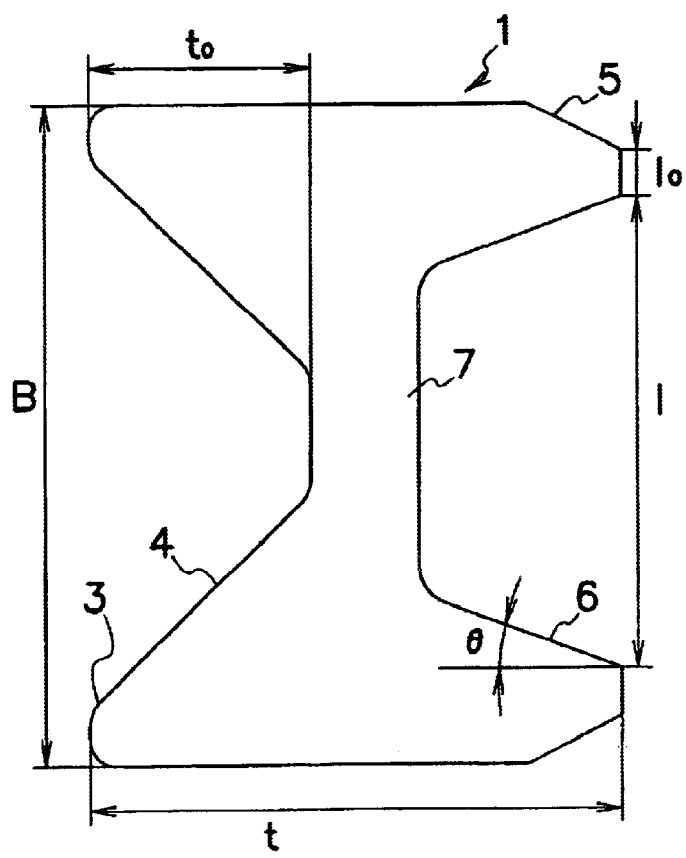
FIG. 3 is a cross section of the ring body generally formed into I-shape.
Figure 4:
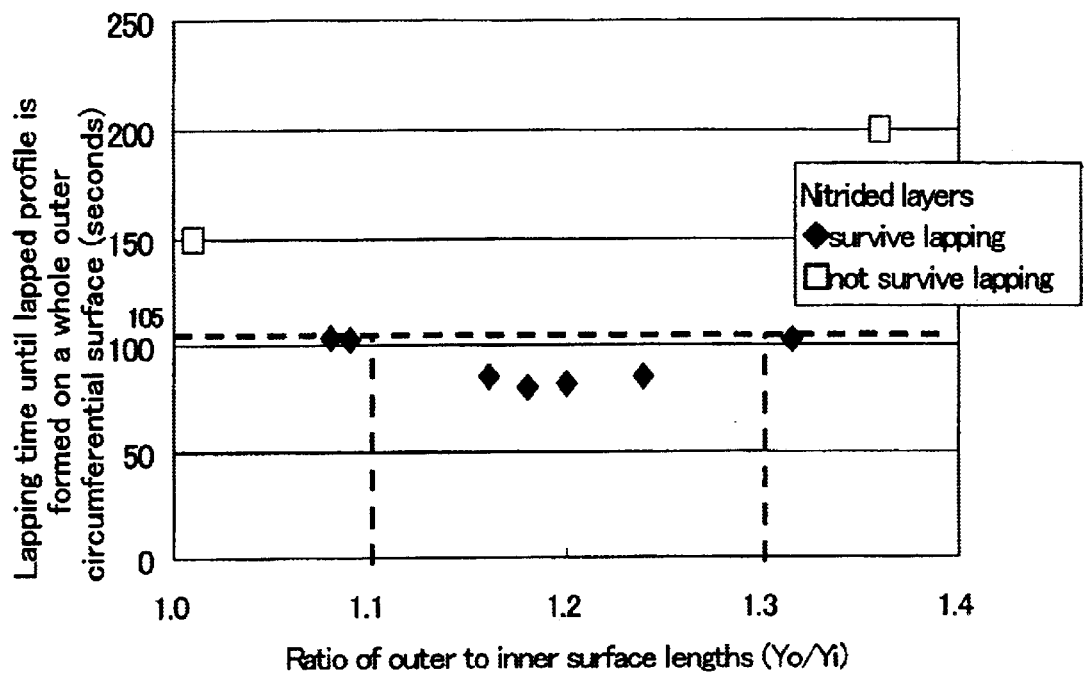
FIG. 4 is a graph showing a relationship between lapping time and varied ratio of outer to inner surface lengths.
Figure 5:
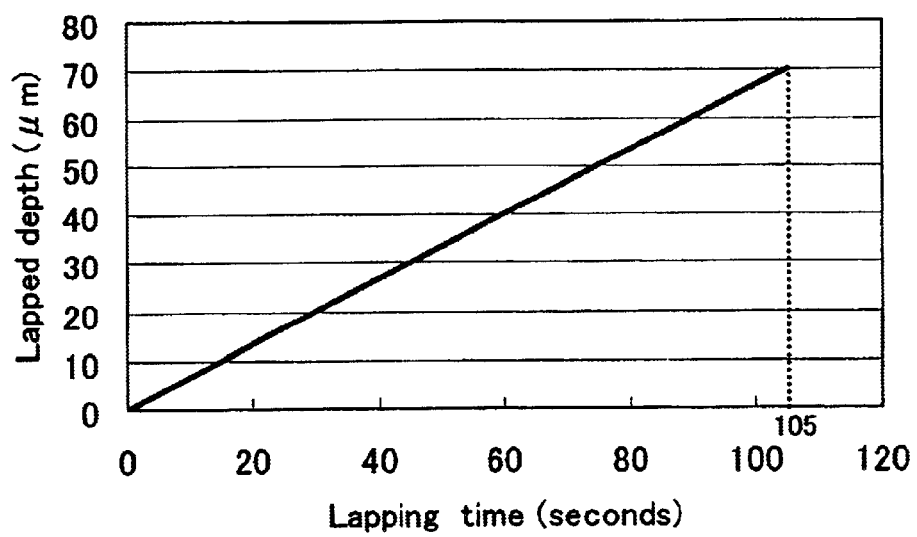
FIG. 5 is a graph showing a proportional relationship between lapping amount and lapping time.

Ring bodies of Samples Nos. 1 to 8 were formed into M-shape shown in FIG. 2 with annular concave groove 4, and ring body of Sample No. 9 was formed into I-shape shown in FIG. 3 with tapered groove 4. The test result reveals that Sample Nos. 1 and 6 do not have whole nitrided layers because they were removed by lapping, and also that Sample Nos. 2 to 5 and 7 to 9 bear nitrided layers left after lapping was carried out to generate lapped profile throughout the whole outer circumferential surface of ring body. FIG. 4 is a graph indicating the result of the table, clearly demonstrating a fact that the ratio $\tau$ of an outer surface (edge) length $Y_o$ to an inner surface (edge) length $Y_i$ in the cross section of the ring body 1 should be in a range between 1.08 and 1.32, more preferably between 1.0 to 1.3 with the following advantages:

[1] Dynamic balance can be maintained between forces produced in outer and inner nitrided layers 14, 15 in ring body 1 after nitridation.
[2] Ring body produces reduced or less strain, keeping precise peripheral circularity after nitridation.
[3] Lapped profile of nitrided layer can survive lapping on outer surface of ring body 1 due to less distortion of ring body 1.
[4] Lapping time can be shortened for outer and inner nitrided layers 14, 15.
[5] Lapping is facilitated.
[6] Yield of oil rings can be improved.

What is claimed is:

1. A two piece oil control ring comprising a ring body formed into a generally M- or I-shaped section with an annular groove on an inside surface of the ring body; and a coiled expander attached in the annular groove of the ring body for resiliently urging the ring body toward an inner wall of a cylinder, said ring body comprising an upper rail, a lower rail and a web that connects said upper and lower rails, said web being provided with a plurality of openings for allowing lubricating oil to pass therethrough, said ring body being made of stainless steel that contains chromium of 3.0 to 13.0 weight % with the outer and inner circumferential surfaces covered with nitrided layers, and a circular ratio of an outer surface length to an inner surface length in the cross section of the ring body being in a range between 1.08 and 1.32.

2. A two piece oil control ring as defined in claim 1, wherein said circular ratio of the outer surface length to inner surface length being in a range between 1.1 to 1.3.

3. A two piece oil control ring as defined in claim 1 or 2, wherein said ring body has its width of 1.2 to 2.0 mm, thickness of 1.2 to 2.0 mm, land width of 0.15 to 0.22 mm and annular groove depth of 0.5 to 0.75 mm.

\* \* \* \* \*